United States Patent [19]

McKnight et al.

[11] Patent Number: 5,250,851
[45] Date of Patent: Oct. 5, 1993

[54] VIDEO MONITOR SUPPORT AND POWER DISTRIBUTION ASSEMBLY

[75] Inventors: William J. McKnight, San Diego; Eric S. Stevens, El Cajon, both of Calif.

[73] Assignee: Proxima Corporation, San Diego, Calif.

[21] Appl. No.: 717,375

[22] Filed: Jun. 19, 1991

[51] Int. Cl.⁵ .............................. F16M 11/00
[52] U.S. Cl. ........................ 307/38; 248/346; 248/917; 307/155; 358/248
[58] Field of Search .................... 358/93, 248, 254; 315/3; 313/482; 340/720; 439/638, 650, 654, 655, 926, 928; 312/7.2; 364/146, 188, 708; 361/334, 350, 351, 384, 390, 395, 419; 307/38, 42, 112, 113, 115, 147, 150, 154, 155; 248/346; 917–924

[56] References Cited

U.S. PATENT DOCUMENTS

| | | | |
|---|---|---|---|
| 4,500,150 | 2/1985 | Leibensperger et al. | 439/650 X |
| 4,547,027 | 10/1985 | Scheibenreif | 248/921 X |
| 4,710,851 | 12/1987 | Pastecki | 361/384 |
| 4,735,467 | 4/1988 | Wolters | 312/29 |
| 4,781,347 | 11/1988 | Dickie | 248/183 |

*Primary Examiner*—A. D. Pellinen
*Assistant Examiner*—David Osborn
*Attorney, Agent, or Firm*—Bernard L. Kleinke; Jerry R. Potts; William Patrick Waters

[57] ABSTRACT

A housing having a front angularly inclined portion, and a central platform portion for supporting from below, a video monitor. A rear portion includes sockets for connecting electrically to electrical equipment associated with the monitor for power control purposes. Actuator members are mounted reciprocatively in an angular front face of the front portion to switch power to the video monitor and a computer upon which the housing and video monitor are stacked.

16 Claims, 4 Drawing Sheets

VIDEO MONITOR SUPPORT AND POWER DISTRIBUTION ASSEMBLY

DESCRIPTION

1. Technical Field

The present invention relates in general to a power distribution assembly and method of making such an assembly, and it more particularly relates to a power distribution assembly and method for supporting a video monitor in ergonomic alignment on an associated central processing unit and for permitting a user to selectively control the supplying of electrical power to the central processing unit and a group of associated remotely located peripheral devices.

2. Background Art

There have been many different types and kinds of power protection systems and methods for protecting delicate electronic devices, such as central processing units and the like. Such systems and methods generally control the supplying of electrical power provided to such devices so they are protected from excessive line voltage surges and transient noise spike occurring on a primary power line energizing such devices.

While such prior known methods and systems have been acceptable for certain applications, they have generally included large bulky surge suppressor assemblies or plug-in-power strips remotely located from the central processing unit and its associated individual peripheral devices. In this regard, such arrangements generally require that the various power control cables associated with the central processing unit and each of its peripheral devices be interconnected to such a strip or assembly for protection purposes. While this arrangement provides the desired surge protection, it has proven to be inconvenient because the system user must first energize the remotely located suppressor circuits and then energize the central processing unit and its associated peripheral devices which may also be disposed in remote locations from the processor.

Therefore it would be highly desirable to have a power suppression system and method that would be convenient to use for surge protection purposes and that would enable a user to control the energization of individual peripheral devices from a single centralized location.

One attempt at overcoming the above mentioned problem was to provide a power controller with a suppressor assembly mounted in a convenient housing disposed on top of a central processing unit, for controlling the individual energization of the central processing unit and its various peripheral devices. The controller included a series of switch actuators extending from the front face portion of the housing to enable a user to actuate conveniently the power suppression assembly as well as power switches for enabling power to be supplied to each peripheral device as well as the central processing unit.

While such a system and method provides a user with a centralized control station for energizing a computer system, the positioning of the housing on the central processing unit causes the monitor to be raised from its normal resting position on the central processing unit. In this regard, conventional personal computer systems are ergonomically designed for a user's convenience so that when the video monitor is placed on top of the central processing unit the monitor viewing screen is at an ergonomically preferred eye level for the viewing of a user. However, by placing the power distribution assembly between the central processing unit and the monitor as described above, the ergonomic alignment of the monitor viewing screen is not aligned advantageously to the greatest extent possible with the line of sight of the user.

Therefore, it would be highly desirable to have a new and improved power distribution assembly that helps retain to a greater extent the ergonomic alignment between the eye level of the system user and the central processing unit and its associated video monitor. Such an assembly should be able to be mounted on top of the central processing unit for supporting a video monitor while affecting the ergonomic balance of viewing screen of the video monitor relative to the line of sight of a user to substantially the smallest extent possible.

Another problem associated with the above described power distribution assembly was accidental activation or deactivation of the system central processing unit or associated peripheral devices. In this regard, the switch actuators on such power control assemblies generally extended horizontal outwardly toward a system user, and thus, the clothing of a user could accidentally snag on such actuators. Such accidents may result in the loss of data if the data has not been stored before the loss of power.

While most users of personal computer systems prefer to position the system video monitor on the top surface of its associated central processing unit, certain users either because of their physical stature or because of limited working area space, do not. In this later situation, the user typically has the central processing unit separated from the video monitor. For example, the processing unit may be mounted on the side of the working area or resting on an adjacent supporting area.

While such an arrangement of the system processor may enable a user to place the video monitor on top of a centralized power suppression housing unit as mentioned above, such an arrangement has proven to be less than satisfactory with respect to using such a housing unit.

In this regard, if the user positioned the central processing unit to the side of the housing with only the keyboard, monitor and housing positioned in front of the user, the switch actuator extending from the front of the housing not only are concealed by the keyboard terminal, but also may be engaged accidentally. In this regard, if the user moved the keyboard forwardly accidentally toward the housing, the keyboard terminal may be jammed into the switch actuators, causing switch activation or deactivation if the applied force is too excessive.

Therefore, it would be highly desirable to have a new and improved power distribution system that would have a set of switch actuators that are readily accessible to a user, highly visible and that cannot be engaged accidentally by a foreign object or snagged easily by the clothing of a user.

DISCLOSURE OF INVENTION

Therefore, it is the principal object of the present invention to provide a new and improved power distribution assembly and method of using such an assembly that enables a user to have centralized control over the individual energization of a central processing unit and its associated peripheral devices.

Another object of the present invention is to provide such a new and improved power distribution assembly and method of using the assembly that eliminates substantially accidental and unintentional power activation or deactivation of a central processing unit and its associated peripheral devices.

Still yet another object of the present invention is to provide such a new and improved power distribution assembly and method of using the assembly that permits the assembly to support from below a video monitor, while reducing substantially the interference with the ergonomic line-of-right design of positioning of the viewing screen relative to the viewer using the computer system.

Briefly, the above and further objects of the present invention are realized by providing a new and improve power distribution assembly and method of using it with a central processing unit and its associated peripheral devices.

The power distribution assembly includes a housing having a front angularly inclined portion, and a central platform portion for supporting from below, a video monitor. A rear portion includes sockets for connecting electrically to electrical equipment associated with the monitor for power control purposes. An actuator member is mounted reciprocatively in an angular front face of the front portion to facilitate user access.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
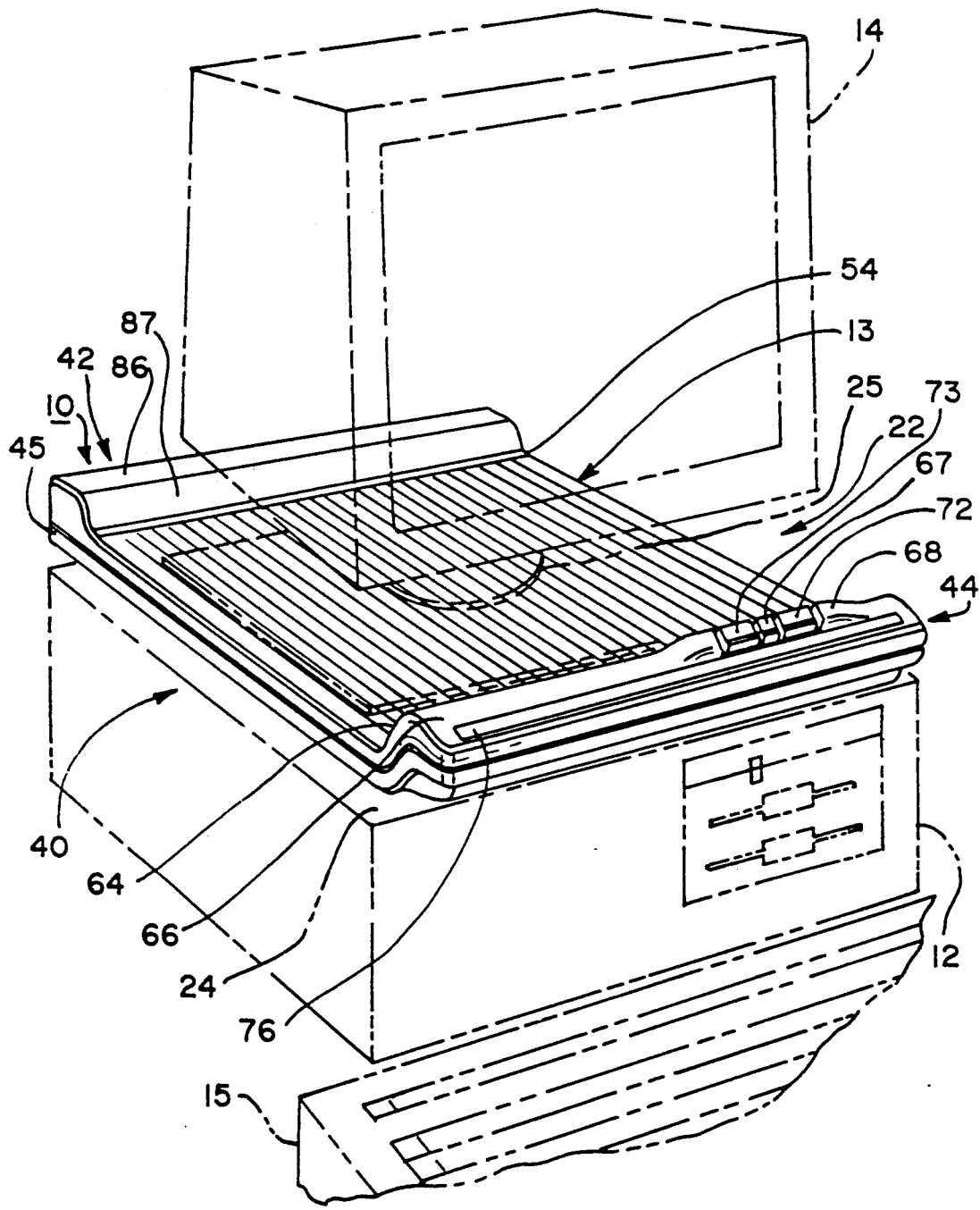
FIG. 1 is a pictorial view of a power distribution assembly illustrated in operational view disposed between a central processing unit and its associated video monitor.

Referring now to the drawings and more particular to FIG. 1 thereof, there is shown a power distribution assembly 10 for controlling selectively and individually electrical power supplied to a central processing unit 12 and an associate group of peripheral devices, such as a video monitor 14 and keyboard 15. The power distribution assembly 10 is shown in operative position supporting the monitor 14 in an ergonomically improved advantageous user line of sight position.

The power distribution assembly 10 generally comprises a housing 13 having a power control unit 16 mounted therein for controlling the individual energization of the central processing unit 12, and a group of remotely located peripheral devices (not shown). The central processing unit and its associated remotely located peripheral devices are electrically connected to the assembly 10 by a set of power control cable (not shown). The processing unit 12 is adapted to distribute electrical power to the monitor 14 and keyboard 15 by a set of power/control cables (not shown) interconnecting the central processing unit 12 with the video monitor 14 and keyboard 15.

As will be explained hereinafter in greater detail, the assembly 10 includes a group of sockets 30-33 adapted to receive therein the power/control cables from the central processing unit and its associated remotely located peripheral devices. A power input socket 29 permits a source of electrical power to be connected to the assembly 10 via a power cord (not shown).

While the preferred form of the present invention utilizes a power cord to plug into the power input socket 29, it will be understood by those skilled in the art that a power cord could be provided the assembly 10 enabling the assembly to be plugged into a conventional wall socket power outlet.

The housing 13 includes a smoothly contoured raised front portion 44 having a face portion 66 sloping forwardly downwardly toward a surface supporting from below the assembly 10. The face portion 66 includes a pair of openings, such as an opening 70 (FIG. 4) for receiving therein a set of switch actuators 20 and 21 to enable a user to individually energize the central processing unit 12 and its associated remotely located peripheral device.

In the preferred form of the present invention the assembly 10 is shown with four outlet sockets and two switch actuators, it will be understood by those skilled in the art that the assembly could be modified to include a greater number of actuators and outlet sockets for controlling a larger number of remotely located peripheral devices.

In order to control the power selectively to each peripheral device as well as the central processing unit 12, the user positions the power switch for each device and unit in an ON position. Placing such switches in their ON positions will not cause their energization as the electrical power to their associated sockets, such as the sockets 30-33, has not been established. In this regard, in order to establish such power paths, the user selectively activates individual ones of the switches 20 and 21 as will be explained hereinafter.

Figure 4:
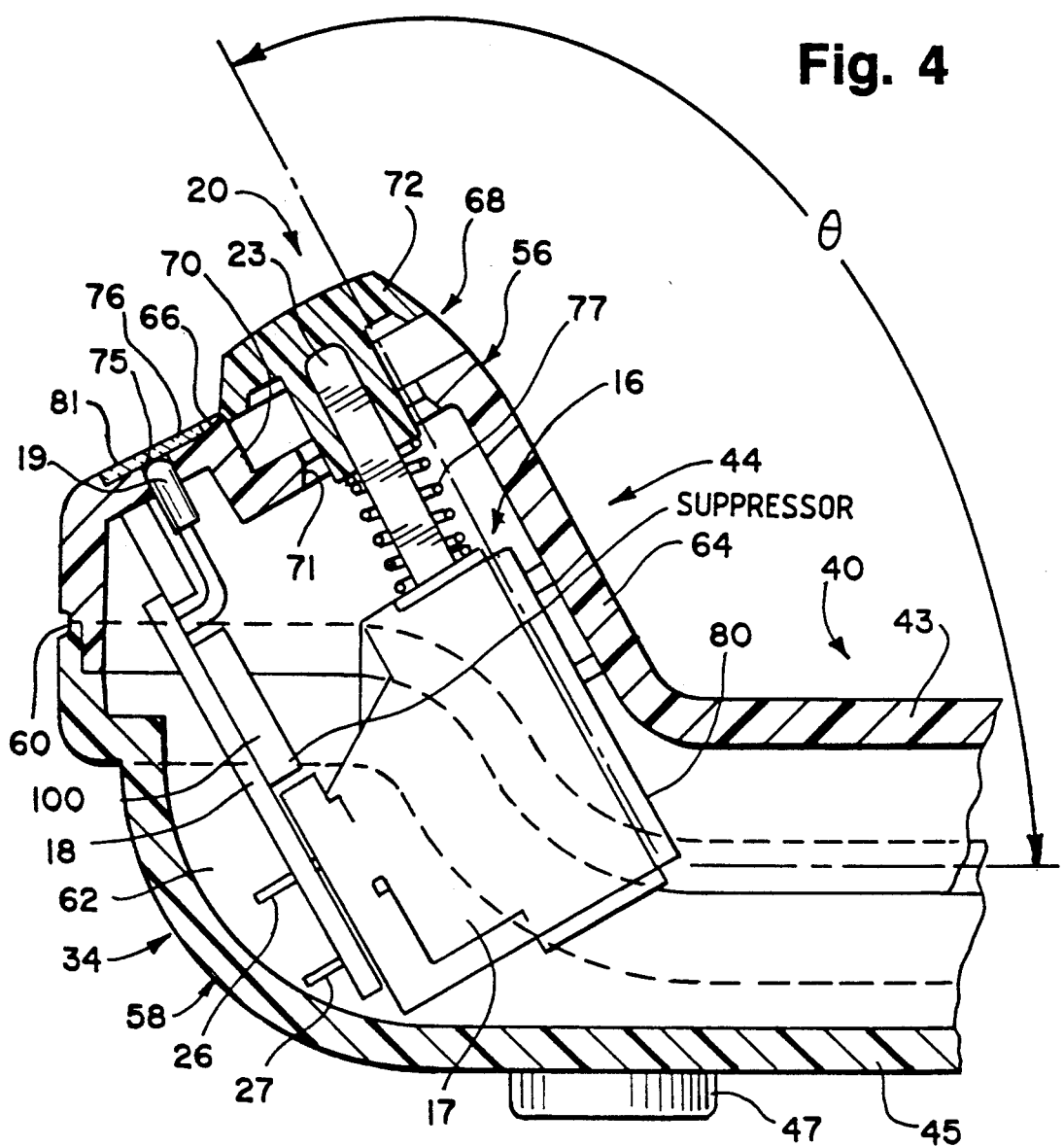
FIG. 4 is a greatly enlarged sectional view of the front portion of the power distribution assembly of FIG. 3 taken substantially on line 4—4 thereof.

Considering now the power control unit 16 in greater detail with reference to FIG. 4, the power control unit 16 includes a suppressor network (100) mounted in a controller housing 17 for suppressing electrical transient signals on the main power line connected to the assembly 10 via the socket 29. The power control unit 16 also includes a set of power control boards, such as a power control board 18 for providing a user with a visual indication of whether a particular piece of electrical equipment connected to the assembly 10 is energized with power. The power control unit 16 also includes a set of power switches (not shown) that cooperate with the switch actuators 20 and 21 for coupling electrical power to the central processing unit 12 and its associated peripheral device respectively. The switches when disposed in a closed position establish selectively current flow paths between the power input socket 29 and the respective power outlet sockets 30-33 via a set of electrical conductors (not shown).

Considering now the housing 13 in greater detail with reference to FIGS. 1-5, the upper portion 38 generally comprises a thin flat centrally disposed platform portion, shown generally at 40 (FIG. 2) that is integrally connected between a rear portion 42 and a front portion 44. As best seen in FIG. 1, the rear portion 42 and the front portion 44 are both angularly inclined relative to the platform portion 40 to define a monitor receiving area 22 on the housing 34.

Figure 2:
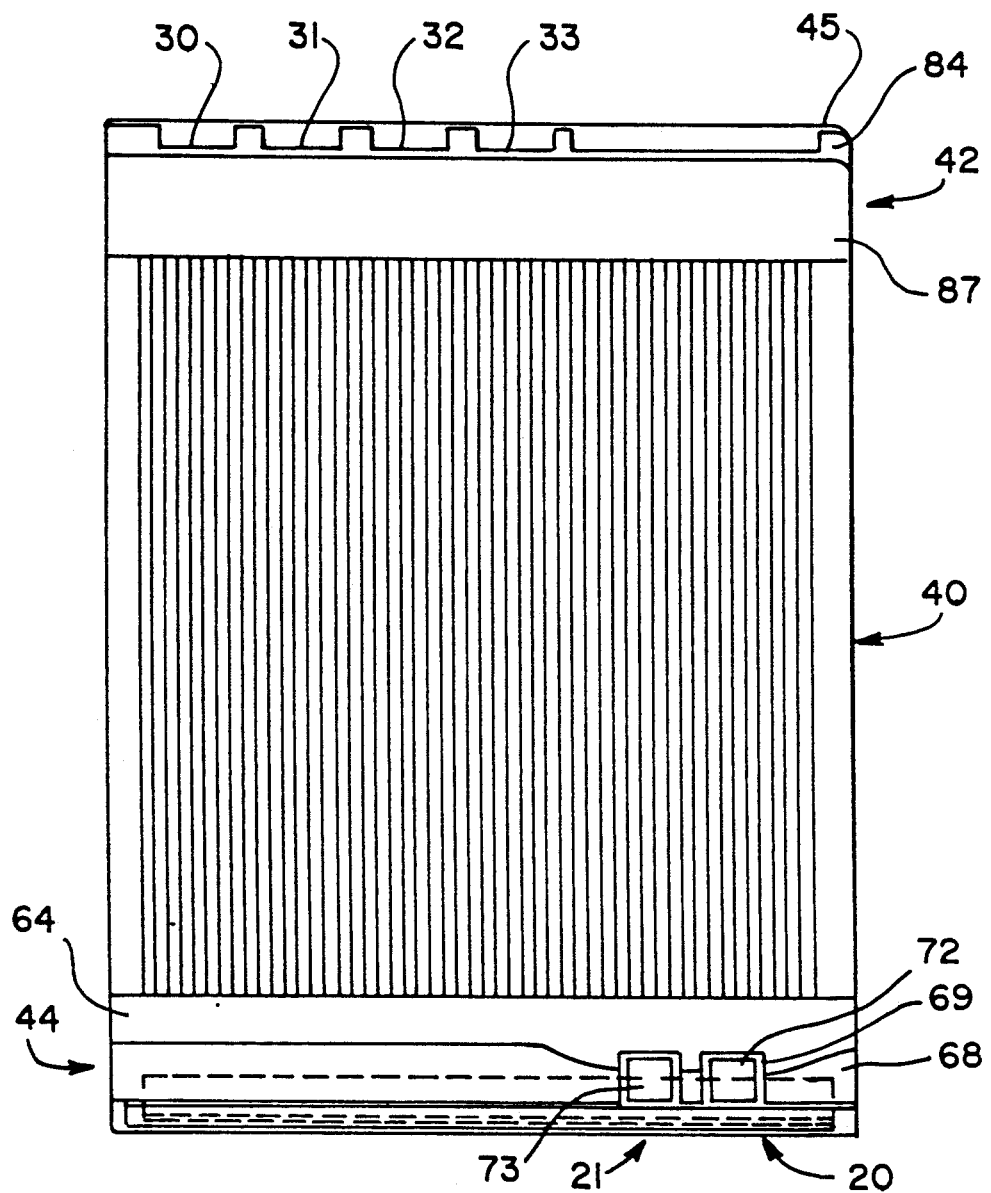
FIG. 2 is an enlarged front elevational view of the power distribution assembly of FIG. 1.
Figure 3:
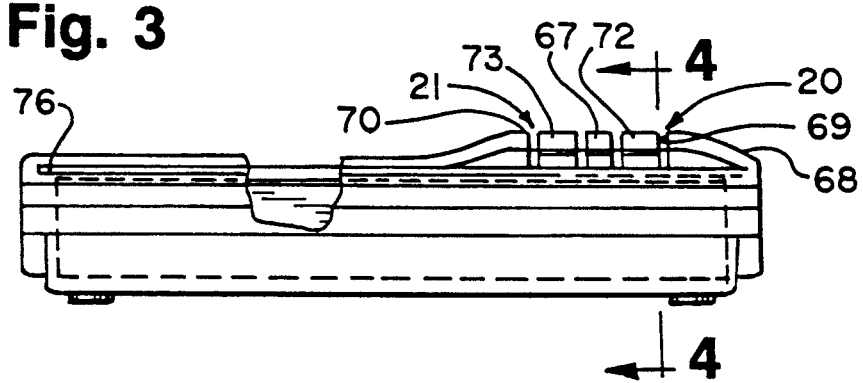
FIG. 3 is an enlarged front elevational view of the power distribution assembly of FIG. 1.

Considering now the platform portion 40 in greater detail with reference to FIGS. 1, 2 and 4, the platform portion 40 is a thin flat generally rectangularly shaped structure which is sufficiently thin to cooperate with the lower base section 36 to help improve the advantageous ergonomic alignment between the viewing screen of the video monitor 14 and the line of sight of the viewer when in a normal sitting position in front of the central processing unit 12 and the monitor 14.

The platform portion 40 includes a centrally disposed monitor supporting portion 49 integrally connected between a front terminal end portion 44 and a rear terminal end portion 54. The front terminal end portion 43 is integrally connected to the front portion 44 at angle $\phi$. The angle $\phi$ is between about 20° and about 40°. A more preferred angle $\phi$ is between about 23° and about 35°, and a most preferred angle $\phi$ is about 30°. The rear terminal end portion 54 is integrally connected to the rear portion 42 at an angle $\gamma$. The angle $\gamma$ is between 35° and about 55°. A more preferred angle is between about 40° and 50°, and a most preferred angle is about 45°.

Considering now the base or lower section 36 in greater detail, the lower section 36 is generally includes a thin flat rectangularly shaped plate portion 45 which is integrally connected to a curvavous lower front portion 58, flat, rectangularly shaped upper plate 43 and a spaced apart, flat, rectangularly shaped lower plate 45. The lower plate 45 has mounted thereto a set of support feet, such as feet 47 and 49A for resting on an upper surface 24 of the central processing unit 12. The platform portion 40 has a sufficiently small footprint pattern to permit the platform portion 40 to be easily supported on a small working area, such as the upper surface area 24 of the central processing unit 12.

Considering now the front portion 44 in greater detail with reference to FIGS. 1 and 4, the front portion 44 generally includes a smoothly contoured angularly inclined top portion 56 and a curvaceously shaped face portion 66 with a downwardly depending skirt portion 59.

The top portion 56 includes a smoothly contoured rear wall portion 64 which is integrally connected to the upper plate 43 of the platform portion 40. The skirt 59 is integrally connected to the lower front portion 58 of the base section 36. The base section 36 and the skirt 59 are joined together at the joint 60 by a suitable bonding technique such as heat welding and the like. As best seen in FIG. 4, when the lower section 36 and the upper section 38 are joined together they define a receiving space 62 that is sufficiently large to accommodate therein the power control unit 16.

The face portion 60 is a forwardly inclined substantially flat surface having a smoothly contoured protuberance 68 disposed thereon. The protuberance 68 includes a pair of elongated axially-extending open recesses or slots 69 and 70. The slots 69 and 70 are spaced apart by a centrally disposed separator 67 forming part of the protuberance 68 for helping to prevent the finger of a user from activating more than one switch activator at any given time. The slots 69 and 70 extend longitudinally throughout a central portion of the axial length of the protuberance 68. Openings are disposed in the base of each of the slots 69 and 70, such as an opening 71 for permitting individual ones of the switch actuators 20 and 21 to extend therethrough for actuation purposes. In this regard, each switch actuator, such as switch actuator 20 includes an upwardly projecting actuator rod, such as a rod 23 (FIG. 4), that extends through the opening 71 a sufficient distance to engage a finger engageable member on cover, such as a cover 72. The cover 72 is supported from below by the actuator rod 23 and a resilient spring 77 that enables the actuator rod 23 and its associated cover 72 to return to their initial resting position (as shown in FIG. 4) when depressed downwardly by the finger of a user and then released.

As best seen in FIG. 1, the cover 72 and an associated cover 73 facilitating the actuation of the power switches (not shown) disposed within the power unit 16 and are disposed substantially entirely inside the elongated slots 69 and 70 respectively for the purpose of preventing inadvertent activation by the user. Each cover includes a conventional mounting socket for engaging and securing removably the switch cover to its associated actuator rod.

For the purpose of mounting the power control unit 16 in proper alignment relative to the slots 69 and 70, the front portion 44 also includes a mounting bracket 80 (FIG. 4) which is integrally connected to the rear wall portion 64. In this regard, the bracket 80 forms an angle $\theta$ relative to the central midplane of the platform portion 40. A preferred angle $\theta$ is between about 110° and 130°. A more preferred angle $\theta$ is between about 115° and 125°, and a most preferred angle $\theta$ is about 120°.

The upper wall portion 66 also includes a recess 81 and a set of elongated openings or slots 74 and 75 disposed therein. The slots 74 and 75 extend substantially parallel with the slots 69 and 70 respectively and throughout their entire axial lengths. A suitable cover 76 is disposed within recess 81 to form a viewing window for a set of light emitting diodes, such as a light emitting diode 19 mounted on the printed circuit board 18.

Figure 5:
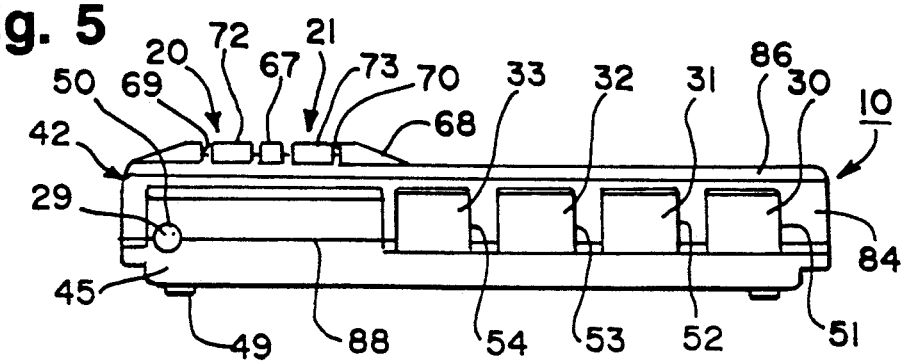
FIG. 5 is an enlarged rear elevational view of the power distribution assembly of FIG. 1.
Figure 6:
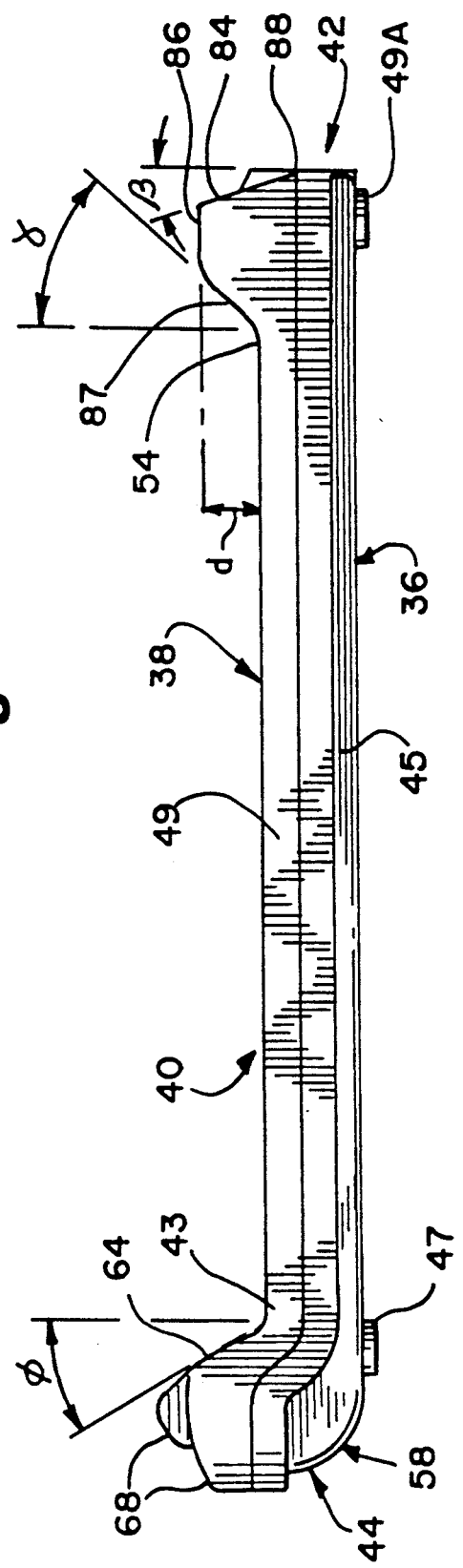
FIG. 6 is an enlarged side elevation view of the power distribution assembly of FIG. 1.

Considering now the rear portion 42 in greater detail with reference to FIGS. 1, 2 and 5, the rear portion 42 generally includes a generally smooth flat upper platform 86 that is integrally connected between a downwardly depending smoothly contoured front wall portion 87 and a downwardly depending curvaceously shaped rear wall portion 84. The front wall portion 87 is integrally connected to the rear terminal end portion 54. The vertical distance between the upper platform 86 and the monitor supporting portion 49 of the platform 40 is a sufficient distance "d" (FIG. 6) to allow the monitor 14 to be tilted rearwardly on a swivel base 25 attached thereto without engaging the rear portion 42. The rear wall portion 84 is inclined angularly downwardly in order to help minimize the overall vertical height of the rear portion 42, and terminates in a lip, shown generally at 88.

The rear wall portion 84 is inclined downwardly relative to a vertical plane at an angle $\beta$. The angle $\beta$ is between about 23° and about 13°. A more preferred angle $\beta$ is between about 20° and about 16°, and the most preferred angle $\beta$ is about 18$\frac{1}{2}$°. The rear wall portion 84 also includes a set of spaced apart openings or holes 50-54 which are sufficiently dimensioned to receive therein the sockets 29-33, respectively. In this regard, the body portion of the sockets 29-33 are received within a space (not shown) when the upper portion 38 and base portion 36 are joined together. The sockets 29-33 are mounted in openings 50-54 respectively by means not shown.

Considering now the power control unit 16 in greater detail with reference to FIG. 4, the power control unit 16 includes a conventional power suppression circuit (not shown) mounted in a power control unit or module 17. The module 17 is adapted to be removably mounted in the bracket 80 by means not shown. The module 17 includes a set of power switches (not shown) which are adapted to be actuated by the actuator rods, such as the actuator rod 23. The module 17 also includes a set of connector pins, such as the pins 26 and 27 for securing the printed circuit board 18 in a parallel spaced apart manner from the switch actuator rods, such as the actuator rod 23. The printed circuit board 18 is secured to the pins 26 and 27 by any conventional bonding technique, such as a soldering technique or the like.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A power distribution unit for controlling electrical equipment including a central processing unit, and a video monitor unit, said video monitor unit having a viewing screen and being adapted to be supported from below by a top wall of the central processing unit with the viewing screen in ergonomic alignment with the line of sight of a viewer when the user is in a normal sitting position in front of the units, comprising:
   lower housing means having a bottom wall being dimensioned to enable it to fit on the top wall of the central processing unit;
   upper housing means connected to said lower housing means, said upper housing means having platform means for supporting from below the video monitor in a spaced apart manner from the central processing unit, said platform means being dimensioned to enable it to receive the video monitor unit in resting relationship thereon;
   said lower housing means and said upper housing means defining a hollow housing unit having a sufficiently thin, low profile to maintain substantially said ergonomic alignment;
   said platform means and said bottom wall being spaced apart a sufficiently short distance to cause the video monitor to be in close proximity to the top wall of the central processing unit when the video monitor is supported from below by said platform means and said bottom wall is positioned on the top wall of the central processing unit to help maintain substantially said ergonomic alignment;
   said housing unit having at least one upturned angularly inclined hollow peripheral edge portion angularly inclined relative to said platform means for helping to contain the video monitor in its resting relationship on said platform means;
   computer electrical connector means mounted on said housing unit for coupling power to the electrical equipment including the video monitor unit and the central processing unit;
   power electrical connector means attached to said housing unit for coupling the computer electrical connector means electrically to a supply of electrical power;
   actuator means in circuit with at least one of said connector means for enabling a user to activate or deactivate electrically the electrical equipment to be controlled; and
   a surge suppressor mounted within said upturned edge portion and in circuit with said actuator means for helping to attenuate undesirable electrical power transient signals to protect the electrical equipment to be controlled.

2. A power distribution unit according to claim 1, wherein said lower housing means, and said upper housing means are secured removably together.

3. A power distribution unit according to claim 1 wherein said inclined hollow peripheral edge portion includes a protuberance for helping to protect said actuator means from being actuated accidentally.

4. A power distribution unit according to claim 3 wherein said peripheral edge includes an elongated viewing slot extending in a parallel spaced apart manner relative to said protuberance.

5. A power distribution unit according to claim 4 wherein said actuator means includes a plurality of spring loaded actuators coupled to control switch means for enabling a user to actuate said switch means.

6. A power distribution unit according to claim 5 wherein said actuator means further includes a printed circuit board.

7. A power distribution unit according to claim 6 wherein said printed circuit board includes a plurality of light emitting diodes mounted thereon.

8. A power distribution unit according to claim 7 wherein said light emitting diodes are mounted on said printed circuit board in an upwardly inclined manner for emitting light through said viewing slot.

9. A power distribution unit according to claim 8 wherein said viewing slot is covered with a protective strip of material for preventing access to said light emitting diodes.

10. A power distribution unit according to claim 5 wherein each one of said spring loaded actuators includes a rod member.

11. A power distribution unit according to claim 10 wherein said protuberance includes an opening disposed in alignment with each one of said rod members to enable said rod members to extend therethrough in an unimpeded manner.

12. A power distribution unit according to claim 11 wherein said actuator means further includes cap means providing a finger engaging surface for each one of said rod members.

13. A power distribution unit according to claim 10 wherein said protuberance includes means defining a slot and wherein said cap means is disposed entirely or substantially within said means defining a slot for engaging said rod members.

14. A power distribution unit according to claim 1, wherein said peripheral edge portion includes a generally elongated protuberance having a pair of centrally disposed elongated openings disposed therein.

15. A power distribution unit according to claim 1, further including read-out display means mounted at least partially in said inclined peripheral edge portion adjacent to said actuator means.

16. A power distribution unit for use with electrical equipment including a central processing unit, and a video monitor unit, said video monitor unit having a viewing screen and being adapted to be supported rom below by a top wall of the central processing unit with the viewing screen in ergonomic alignment with the line of sight of a viewer when the user is in a normal sitting position in front of the units, comprising:

lower housing means having a bottom wall being dimensioned to enable it to fit on the top wall of the central processing unit;

upper housing means connected to said lower housing means, said upper housing means having platform means for supporting from below the video monitor in a spaced apart manner from the central processing unit, said platform means being dimensioned to enable it to receive the video monitor unit in resting relationship thereon;

said lower housing means and said upper housing means defining a hollow housing unit having a sufficiently thin low profile to maintain substantially said ergonomic alignment;

said platform means and said bottom wall being spaced apart a sufficiently short distance to cause the video monitor to be in close proximity to the top wall of the central processing unit when the video monitor is supported from below by said platform means and said bottom wall is positioned on the top wall of the central processing unit to help maintain substantially said ergonomic alignment;

said housing unit further having an upturned front hollow peripheral edge portion and an upturned rear hollow peripheral edge portion, each hollow edge portion being angularly inclined outwardly from said platform means at a sufficient angle for helping to contain the video monitor in its resting relationship on said platform means;

actuator means mounted in an uppermost edge portion of said upturned front hollow peripheral edge portion for enabling a user to activate and deactivate electrically the electrical equipment;

connector means mounted in said upturned rear hollow peripheral edge portion or helping to coupled electrically the electrical equipment to a source of electrical power; and means for mounting said actuator means within said upturned front edge portion at an inclined obtuse angle $\theta$ relative to the plane of said platform means for helping to prevent the fingers or clothing of the user from activating said actuator means accidentally.

* * * * *